United States Patent
Krebs (10) Patent No.: US 9,089,829 B2
(45) Date of Patent: *Jul. 28, 2015

(54) METHOD AND DEVICE FOR ENHANCING A PROCESS INVOLVING A SOLID OBJECT AND A GAS

(71) Applicant: FORCE TECHNOLOGY, Brondby (DK)

(72) Inventor: Niels Krebs, Hellerup (DK)

(73) Assignee: Force Technology, Brondby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,594

(22) Filed: Mar. 21, 2013

(65) Prior Publication Data

US 2013/0309422 A1 Nov. 21, 2013

Related U.S. Application Data

(62) Division of application No. 11/660,109, filed as application No. PCT/DK2005/000528 on Aug. 15, 2005, now abandoned.

(30) Foreign Application Priority Data

Aug. 13, 2004 (DK) .................... 2004 01228
Jan. 7, 2005 (DK) .................... 2005 00030

(51) Int. Cl.
*B01J 19/10* (2006.01)
*B01J 8/02* (2006.01)
(Continued)

(52) U.S. Cl.
CPC ............. *B01J 19/10* (2013.01); *B01J 8/0278* (2013.01); *B01J 8/16* (2013.01); *B01J 12/00* (2013.01);
(Continued)

(58) Field of Classification Search
CPC ............ B08B 3/12; B08B 5/02; B01J 8/0278; B01J 8/16; B01J 12/00; B01J 19/008; B01J 19/10; B01J 19/26; F28F 13/10; C01B 2203/0233; C01B 2203/0805; C01B 2203/1241; F15D 1/12
USPC .................................... 422/128; 436/183
See application file for complete search history.

(56) References Cited

U.S. PATENT DOCUMENTS 2,997,245 A 8/1961 Nilsson et al.
3,005,282 A 10/1961 Christiansen
(Continued)

FOREIGN PATENT DOCUMENTS

DE 1 153 228 8/1963
EP 0 590 432 4/1994
(Continued)

OTHER PUBLICATIONS

Krebs, U.S. Office Action mailed Aug. 31, 2009, directed to U.S. Appl. No. 11/660,109; 7 pages.
(Continued)

*Primary Examiner* — Rebecca M Fritchman
(74) *Attorney, Agent, or Firm* — Morrison & Foerster LLP (57) ABSTRACT

This invention relates to a sonic device (and a method) for enhancing a process involving a solid object and a gas, where the gas surrounds the object or at least is in contact with a surface of the object, the device comprising sonic means for applying a high intensity sound or ultrasound to at least the surface object, wherein the high intensity sound or ultrasound, during use of the sonic device, is applied directly in the gas that is also the medium through which the high intensity sound or ultrasound propagates to the surface of the object, whereby a laminar sub-layer at the surface of the object is reduced and/or minimized. The reduction of the laminar sub-layer provides increased heat transfer efficiency and/or increased catalytic speed and/or increased gas exchange.

10 Claims, 6 Drawing Sheets (51) Int. Cl.

| | | |
|---|---|---|
| *B01J 8/16* | (2006.01) | |
| *B01J 12/00* | (2006.01) | |
| *B01J 19/26* | (2006.01) | |
| *F15D 1/12* | (2006.01) | |
| *F28F 13/02* | (2006.01) | |
| *F28F 13/10* | (2006.01) | |
| *B01J 19/00* | (2006.01) | |
| *C01B 3/38* | (2006.01) | |

(52) U.S. Cl.
CPC ............... *B01J 19/008* (2013.01); *B01J 19/26* (2013.01); *F15D 1/12* (2013.01); *F28F 13/02* (2013.01); *F28F 13/10* (2013.01); *C01B 3/384* (2013.01); *C01B 2203/0233* (2013.01); *C01B 2203/0805* (2013.01); *C01B 2203/1241* (2013.01)

(56) References Cited

U.S. PATENT DOCUMENTS

| | | | |
|---|---|---|---|
| 3,169,507 | A | 2/1965 | Rich |
| 4,347,983 | A * | 9/1982 | Bodai .......................... 239/466 |
| 4,501,319 | A | 2/1985 | Edelman et al. |
| 4,635,571 | A | 1/1987 | Olsson et al. |
| 4,835,958 | A | 6/1989 | Rice |
| 5,367,139 | A | 11/1994 | Bennett et al. |
| 5,387,777 | A | 2/1995 | Bennett et al. |
| 5,457,847 | A | 10/1995 | Uzawa et al. |
| 5,687,610 | A | 11/1997 | Poulsen et al. |
| 5,785,012 | A | 7/1998 | Parsons et al. |
| 6,261,373 | B1 | 7/2001 | Grant |
| 6,383,301 | B1 | 5/2002 | Bell et al. |
| 6,443,796 | B1 | 9/2002 | Shackelford |
| 6,554,969 | B1 | 4/2003 | Chong |
| 6,629,412 | B1 | 10/2003 | Labinov et al. |
| 6,655,304 | B1 | 12/2003 | Barlow |
| 6,949,716 | B2 | 9/2005 | Koulik et al. |
| 7,150,779 | B2 * | 12/2006 | Meegan, Jr. ........................ 95/29 |
| 2001/0029964 | A1 | 10/2001 | Fujii et al. |
| 2002/0182101 | A1 | 12/2002 | Koulik et al. |
| 2003/0165636 | A1 | 9/2003 | Koulik et al. |
| 2003/0226576 | A1 * | 12/2003 | Gray et al. ........................ 134/1 |
| 2004/0105779 | A1 | 6/2004 | Krebs |
| 2007/0065596 | A1 | 3/2007 | Koulik et al. |
| 2009/0288910 | A1 | 11/2009 | Krebs et al. |

FOREIGN PATENT DOCUMENTS

| | | |
|---|---|---|
| GB | 1293360 | 10/1972 |
| JP | 7-31974 | 2/1995 |
| JP | 7-60211 | 3/1995 |
| JP | 7-112119 | 5/1995 |
| JP | 11-335869 | 12/1999 |
| JP | 2000-40689 | 2/2000 |
| JP | 2000-325903 | 11/2000 |
| JP | 2006-13903 | 1/2006 |
| WO | WO-90/09824 | 9/1990 |
| WO | WO-00/41790 | 7/2000 |
| WO | WO-01/97937 | 12/2001 |
| WO | WO-02/078751 | 10/2002 |
| WO | WO-2006/042549 | 4/2006 |
| WO | WO-2008/003324 | 1/2008 |

OTHER PUBLICATIONS

Krebs, U.S. Office Action mailed Jun. 10, 2010, directed to U.S. Appl. No. 11/660,109; 7 pages.

Choi, K-S. et al. (2005). "Improvement of Charging Performance of Corona Charger in Electrophotography by Irradiating Ultrasonic Wave to Surrounding Region of Corona Electrode," Japanese Journal of Applied Physics 44 (5A); 3248-3252.

* cited by examiner

Figure 1a

Prior Art

Prior Art

METHOD AND DEVICE FOR ENHANCING A PROCESS INVOLVING A SOLID OBJECT AND A GAS

REFERENCE TO RELATED APPLICATION

This application is a divisional application of U.S. patent application Ser. No. 11/660,109, filed May 7, 2007, which claims the priority of Denmark Application No. PA200401228, filed Aug. 13, 2004, Denmark PA 200500030, filed Jan. 7, 2005, and PCT/DK2005/000528 filed Aug. 15, 2005, the entire contents of which are hereby incorporated by reference.

FIELD OF THE INVENTION

The invention relates to a sonic device for enhancing a process involving a solid object and a gas by reducing a laminar sub-layer. The invention further relates to a method of enhancing a process involving a solid object.

BACKGROUND OF THE INVENTION

No heat flow is possible without temperature difference. Thus, the heat flux between air/a gas and a surface of an object will be in direct proportion with the temperature difference between the gas and the surface and with the surface conduction, i.e.

$$\phi = h(t_a - t_s),$$

where $\phi$ denotes the heat flux, h the surface conductance, $t_s$ the temperature of the surface and $t_a$ the temperature of the surrounding gas. Surface conductance is measured in $W/m^2K$.

Heat energy tends to migrate in the direction of the decreasing temperature. The heat transfer can take place by the processes of conduction, convention or radiation. Heat is the energy associated with the perpetual movement of the molecules and temperature is a measure of the vigor of this movement. When materials at different temperatures are in contact the more vigorous molecules transfer some of their thermal energy to less vigorous ones by collisions. This is the process of heat conduction. It is the only way in which heat can flow through an opaque solid.

Thermal energy can be transported through a gas by conduction and also by the movement of the gas from one region to another. This process of heat transfer associated with the gas movement is called convection. When the gas motion is caused only by buoyancy forces set up by temperature differences, then the process is referred to as natural or free convention; but if the gas motion is caused by some other mechanism, such as a fan or the like, it is called forced convection.

Figure 2A:
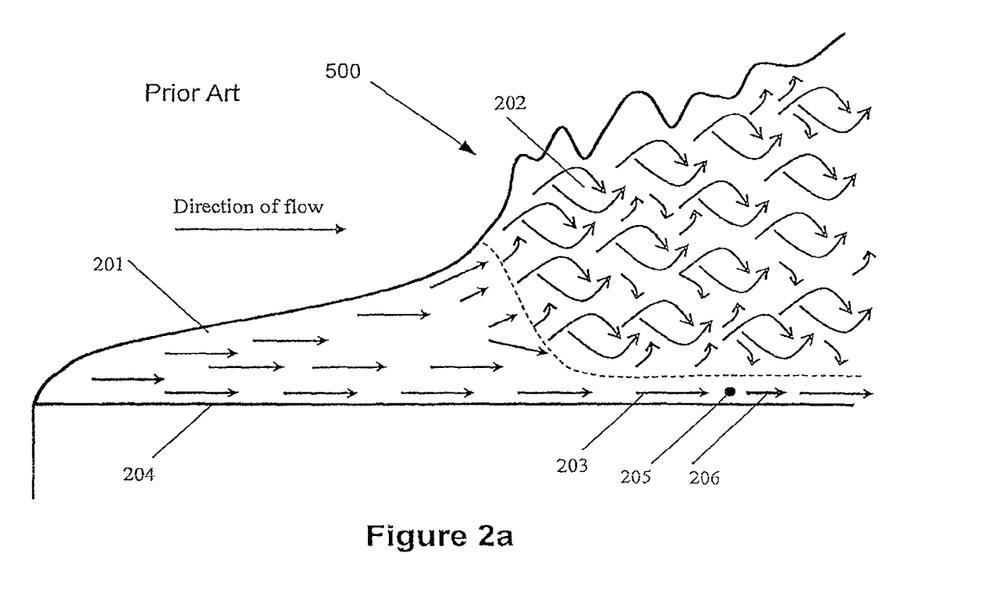
FIG. 2a schematically illustrates a (turbulent) flow over a surface of an object according to prior art.

For nearly all practically occurring gas flows, the flow regime will be turbulent in the entirety of the streaming volume, except for a layer covering all surfaces wherein the flow regime is laminar (see e.g. 203 in FIG. 2*a*). This layer is often called the laminar sub-layer. The thickness of this layer is a decreasing function of the Reynolds number of the flow, so that at high flow velocities, the thickness of the laminar sub-layer will decrease.

Heat transport across the laminar sub-layer will be by conduction or radiation, due to the nature of laminar flow.

Concerning radiation all physical objects continuously lose energy by emission of electromagnetic radiation and gain energy by absorbing some of the radiation from other objects that is incident on them. This process of heat transfer by radiation can take place without the presence of any material in the space between the radiating objects.

Concerning conduction the mass transport across the laminar sub-layer will be solely by diffusion. In the technology relating to heat exchangers, it is well known that the principal impediment to the transfer or transmission of heat from a gas to a solid surface is the boundary layer of the gas, which adheres to the solid surface. Even when the motion of the gas is fully turbulent, there exists a laminar sub-layer that obstructs the transmission of heat. While various methods and types of apparatus have been suggested for overcoming the problem such as by means of driving the gas with sonic waves and vibrating the partition with external vibration generators, these methods while being effective to some extend, are inherently limited in their ability to generate an effective minimization of the laminar sub-layer and at the same time covering an area large enough to make the method efficient.

Likewise, the speed of a catalytic process involving a gas reacting with a catalytic surface is, among many things, limited by the interaction between the gas molecules and the catalytic surface, i.e. by the supply of reactants to and the transport of reaction products away from the catalytic surface. The mass transport through the laminar sub-layer covering the catalytic surface can therefore only be done by diffusion of the reactants and reaction products.

Similarly, when one kind of gas or mixture of gases is actively changed to another composition of gases the time needed to flush the inner surface of the container is limited to the time it takes to change the gases in the laminar sub-layer. This change can only be done by diffusion.

Patent specification U.S. Pat. No. 4,501,319 relates to increased heat transfer between two fluids (i.e. not between an object and gas/air) and provides the increased heat transfer by minimizing the thickness of the laminar sub-layer by establishing a standing wave pattern. However, the use of a standing wave pattern to minimize the laminar sub-layer does not give as very efficient or large reduction of the laminar sub-layer (and thereby increase in heat transfer), since the definition of a standing wave pattern includes a stationary and repeatable location of nodes over the surface. At these nodes there will be no displacement or velocity of the gas molecules.

Patent specification U.S. Pat. No. 4,835,958 describes a process for producing work onto rotatable blades of a gas turbine. The described process involves steam as cooling media and a disruption of laminar steam film on the surfaces of a nozzle thereby ensuring increased heat transfer. This is done by establishing a sonic shock wave to disrupt the laminar sub-layer. Since the surface area covered by the shockwave has to be compared to the surface area used to generate the shock wave, the proposed method does not give a reduction of the laminar sub-layer (and thereby increase in heat transfer) over as large an area as the present invention do, since ultrasound disperses over a larger part of the object in question than the shock wave.

Patent specification U.S. Pat. No. 6,629,412 relates to a turbine generator producing both heat and electricity. The description includes a heat exchanger which uses acoustical resonators (formed by cavities in the surface of the heat exchanger) to prevent formation of a laminar boundary layer. The resonators generate acoustic vortices as the gas flows over the surface of the heat exchanger and thereby creating turbulence in the gas over the surface. The generated turbulence will decrease the size of the laminar layer (see FIG. 2*a*) but the generated acoustic energy is not sufficiently high and therefore not sufficiently efficient at minimizing the sub-layer.

Patent specification JP 07112119 relates to enhancing a catalytic process by applying ultrasound and thereby disturbing a fluid border film over the porous solid catalyst. The arrangement gives an inefficient coupling of the ultrasound from a source/oscillator via the diaphragm and thereafter to the gas. This is related to the large difference in acoustical impedance, which will apply for any solid-gas transition.

Patent specification U.S. Pat. No. 4,347,983 relates to a device for generating ultrasound. It discloses that ultrasound may be useful for enhancing a heat transfer by disruption of a liquid or gas layer. It is further mentioned that catalytic effects can be improved due to molecular breakdown, production of free ions, mixing and other effects. However, this arrangement does not address the disruption of a laminar sub-layer. Further, this arrangement is not very suitable for generating an acoustic pressure at sufficiently high levels needed for effectively disrupting a laminar sub-layer. In addition the causes for improvement of catalytic effects, i.e. molecular breakdown and production of free ions, are effects that only take place under these circumstances in a liquid medium and not in a gaseous medium.

OBJECT AND SUMMARY OF THE INVENTION

It is an object of the present invention to provide a device (and corresponding method) for reducing a laminar sub-layer that solves (among other things) the above-mentioned shortcomings of prior art.

Since diffusion is a slow process it is very useful to decrease the thickness of the laminar sub-layer as much as possible in order to increase the efficiency of any heat or mass transport, i.e. also for a catalytic process or change of gases near a solid surface.

More specifically, it is an object to minimize the limitation of the above described laminar sub-layer and the associated diffusion process(es).

It is a further object to provide an effective minimization of the laminar sub-layer in such a way that larger surface areas can be covered efficiently.

It is an additional object of the present invention to provide a practical implementation by which the minimizing of the laminar sub-layer will significantly increase the efficiency of heat transfer.

It is an additional object of the present invention to provide a practical implementation by which the minimizing of the laminar sub-layer will significantly increase the efficiency of a catalytic process where the catalyst has a solid surface and the reactants are gases.

It is a further object of the present invention to provide a practical implementation by which the minimizing of the laminar sub-layer will significantly increase the efficiency of flushing a volume to change the composition of gases.

These objects, among others, are achieved by a sonic device (and corresponding method) for enhancing a process involving a solid object and a gas, where the gas surrounds the object or at least is in contact with a surface of the object, the device comprising sonic means for applying a high intensity sound or ultrasound to at least the surface of the object, wherein the high intensity sound or ultrasound, during use of the sonic device, is applied directly in the gas that is also the medium through which the high intensity sound or ultrasound propagates to the surface of the object, whereby a laminar sub-layer at the surface of the object is reduced and/or minimized.

In this way, minimization or reduction of the laminar sub-layer on the surface of an object is provided. Further, the laminar sub-layer is minimized over a large area or the entire area of the surface of the object.

Further, greater efficiency with respect to minimization of the laminar sub-layer is provided, due to the larger intensity of the high intensity sound or ultrasound, e.g. compared to other types of sonic waves.

Additionally, since the high intensity sound or ultrasound is generated directly in the air/gas surrounding the object (or at least the air/gas surrounding the relevant surface of the object) (instead of generating the ultrasound in the catalyst or the object to transfer heat from or from any solid transmitter) a greater efficiency of the relevant process is obtained. In this way, less dampening of the intensity is achieved, as there will be substantially no loss from the transition between a solid transmitter of the high intensity sound/ultrasound to the air/gas. This loss will occur whenever there is a large difference in acoustical impedance, which on the other hand will apply for any solid-gas transition.

High intensity sound or ultrasound in gases leads to very high velocities and displacements of the gas molecules. For example, 160 dB corresponds to a particle velocity of 4.5 m/s and a displacement of 33 μm at 22.000 Hz. In other words, the kinetic energy of the molecules has been increased significantly.

In a preferred embodiment, the sonic means comprise: an outer part and an inner part defining a passage, an opening, and a cavity provided in the inner part, where said sonic means is adapted to receive a pressurized gas and pass the pressurized gas to said opening, from which the pressurized gas is discharged in a jet towards the cavity.

In one embodiment, the temperature of said surface is greater than the temperature of said gas, and said process is a heat exchange process, whereby said reduction and/or minimization of the laminar sub-layer causes an increased heat exchange from said object to said gas.

In this way, a forced heat flow from the surface to surrounding gas/air is provided by increasing the conduction by minimizing the laminar sub-layer. The high intensity sound or ultrasound will increase the interaction between gas molecules and the surface and thus the heat conduction that thereafter can be followed by passive or active convection at the surface, i.e. increased heat transfer efficiency is provided, due to reduction of laminar sub-layer.

This is e.g. desirable when the heat transfer is insufficient/too small from a surface of an object to the surrounding air/gas, when cooling of the object and/or heating of the gas is wanted. This will be the case when a too large laminar sub-layer is causing insufficient/reduced heat transfer or if there is a wish to use a smaller heat exchanger. In this way, a maximization of a minimization of the sub-layer is provided thereby increasing the heat flow from a surface into air.

In an alternative embodiment, the temperature of said surface is smaller than the temperature of said gas, and said process is a heat exchange process, whereby said reduction and/or minimization of the laminar sub-layer causes an increased heat exchange from said gas to said object.

In this way, a forced heat flow from the surrounding gas/air to the surface is provided by increasing the conduction by minimizing the laminar sub-layer. This is e.g. desirable when the heat transfer is insufficient/too small from the surrounding air/gas to a surface of an object, when cooling of the air/gas and/or heating of the object is wanted.

In one embodiment, the surface of said object is a catalyst and that said gas comprise at least one reactant of the catalyst, and said process is a catalytic process, whereby said reduction of the laminar sub-layer causes an increased speed of said catalytic process.

In this way, a decrease of the reaction time of a catalytic process (i.e. increase of the speed the catalytic process) in air/gas on the catalyst surface is provided by applying high intensity sound or ultrasound to the surface. Hereby, a forced interaction between gas molecules and the surface of the catalyst is established. The high intensity sound or ultrasound increases the interaction between gas molecules and the surface by minimizing the laminar sub-layer and thus increasing the speed of the catalytic process.

Please note, that this process is not equivalent to ultrasound assisted catalytic processes in fluids, which already are well known and described in the prior art. The actual sound pressure in a gas will for instance be much less than those used in fluids for an ultrasound assisted catalytic process. Similarly there will be no possible cavitations processes in a gas.

This is e.g. desirable when the speed of catalytic process is to insufficient/too small or there is a wish to use a smaller catalyst.

In one embodiment, said surface is an inner surface of a given volume, and said process is a change of gas composition between said gas and a previous gas composition at said inner surface, whereby said reduction of the laminar sub-layer causes an increased gas exchange by increasing the interaction between gas molecules of said gas and said previous gas composition at said inner surface.

In this way, a decrease of the necessary flushing time during a gas exchange in a volume is provided by decreasing the time needed for diffusion over the laminar sub-layer of the surface by applying high intensity sound or ultrasound to the surface. Hereby, a forced interaction between gas molecules and the previous gas composition at the inner surface of the given volume is established. The high intensity sound or ultrasound increases the interaction between gas molecules and the previous gas composition at the surface, i.e. provide increased gas exchange, by minimizing the laminar sub-layer and thus increasing the speed of establishing the new equilibrium.

This is e.g. desirable when the time of flushing (involving a solid surface) with a new gas mixture is insufficient or too slow compared to when the new equilibrium will be established. This is e.g. relevant for the use of protection gases during welding or filling of protective/inactive gasses in food packing, etc, e.g. by removing oxygen or the like.

The present invention also relates to a method of enhancing a process involving a solid object and a gas, where the gas surrounds the object or at least is in contact with a surface of the object, the method comprising the steps of: applying a high intensity sound or ultrasound to at least the surface of the object by sonic means, where the high intensity sound or ultrasound is applied directly in the gas that is also the medium through which the high intensity sound or ultrasound propagates to the surface of the object, whereby a laminar sub-layer at the surface of the object is reduced and/or minimized.

The method and embodiments thereof correspond to the device and embodiments thereof and have the same advantages for the same reasons.

Advantageous embodiments of the method according to the present invention are defined in the sub-claims and described in detail in the following.

The present invention also relates to a nozzle comprising cooling channels wherein said cooling channels is in connection with a sonic device generating ultrasound during use that is distributed in said channels.

The present invention also relates to a printed circuit board comprising at least one sink and at least one fan both arranged to cool at least a part of said printed circuit board or components thereon during use, wherein said printed circuit board further comprises a sonic device generating ultrasound during use that is directed to at least a part of said at least one sink.

BRIEF DESCRIPTION OF THE DRAWINGS

These and other aspects of the invention will be apparent from and elucidated with reference to the illustrative embodiments shown in the drawings, in which.

DESCRIPTION OF PREFERRED EMBODIMENTS

Figure 1A:
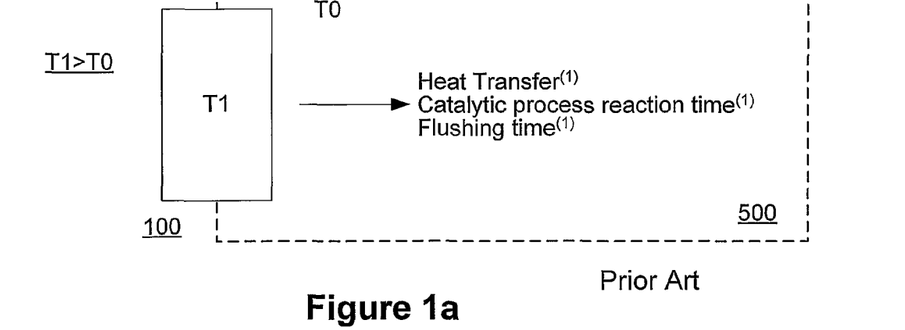
FIG. 1a schematically illustrates an object having a given heat transfer to the surrounding or contacting air/gas or having a given catalytic process reaction time or having a given flushing time according to prior art.

FIG. 1a schematically illustrates an object having a given heat transfer to the surrounding or contacting air/gas or having a given catalytic process reaction time or having a given flushing time according to prior art.

Shown is an object (100) having a surface having a temperature of $T_1$. A surrounding gas or a gas (500), illustrated by a broken box, contacting a relevant surface of the object (100) has a temperature of $T_0$, where $T_1 > T_0$.

According to a first aspect of the present invention, heat energy tends to migrate in the direction of decreasing temperature. The heat transfer can take place by the processes of conduction, convection or radiation. Heat is the energy associated with the perpetual movement of the molecules and temperature is a measure of the vigor of this movement. When materials at different temperatures are in contact the more vigorous molecules transfer some of their thermal energy to less vigorous ones by collisions. This is the process of heat conduction. It is the only way in which heat can flow through an opaque solid.

Former methods have suggested different methods to decrease this laminar sub-layer for instance by establishing a standing wave pattern over the surface. However, the use of a standing wave pattern to minimize the laminar sub-layer does not give a very efficient or large reduction of the laminar sub-layer, since the definition of a standing wave pattern includes a stationary and repeatable location of nodes over the surface. At these nodes there will be no displacement or velocity of the gas molecules. Another method suggests the use of shockwaves, which again has the drawback of covering a small part of the surface. Finally it has been suggested to generate acoustic turbulence at the surface or transfer acoustic energy from a solid, either from the surface itself or from a transmitter. All of them not resulting in those very high levels of intensity that gives the efficiency of decreasing the laminar sub-layer. The condition of FIG. 1a results, for the first aspect, in a given heat transfer[1].

According to a second aspect of the present invention, FIG. 1a schematically illustrates an object (100) being a catalyst. The reactants are the surrounding or contacting gas(ses) (500) and the catalyzing product (100) has to migrate through the laminar sub-layer by diffusion. The catalyst has the temperature $T_1$ and the reactant(s) in gas form (500) has the temperature $T_0$.

Former methods have suggested a method to transfer acoustic energy (high frequency vibration) from a solid transducer, via a solid bar and through a diaphragm. The acoustic energy is emitted into the gas (500) and thereby disturbing the fluid border film on the outer surface of the porous solid catalyst. However, the arrangement gives an inefficient coupling of the ultrasound from the diaphragm to the gas (500). This is related to the large difference in acoustical impedance, which will apply for any solid-gas transition. The condition of FIG. 1a results, for the second aspect, in a given catalytic process reaction time[1].

According to a third aspect of the present invention, FIG. 1a schematically illustrates an object (100) being the inner wall of a volume, where the composition of the gases (500) is going to be changed. The new gas (not specifically shown) and the previous gas (500) have to migrate through the laminar sub-layer by diffusion. The inner wall of the volume has the temperature $T_1$ and the previous gas (500) has the temperature $T_0$.

The condition of FIG. 1a, according to the third aspect, results in a given flushing time[1] before the new equilibrium is established.

Please note, the three mentioned aspects are not exclusive as some of the processes may happen at the same time.

Figure 1B:
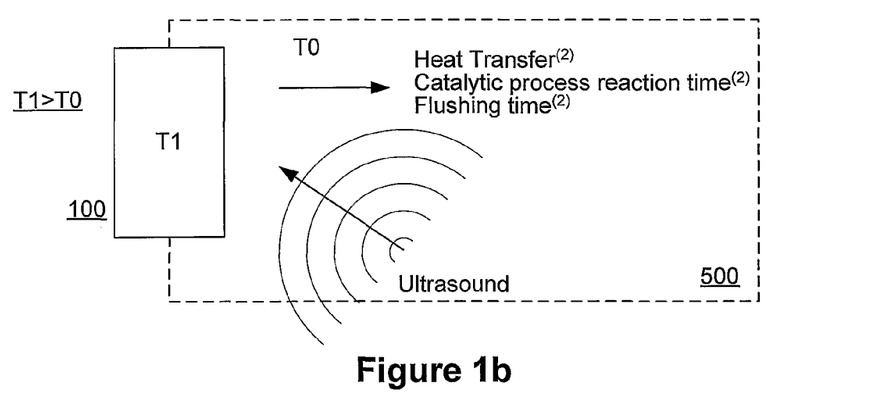
FIG. 1b schematically illustrates the heat transfer, the catalytic process reaction time and/or the flushing time in relation to the object of FIG. 1a when the present invention is applied.

FIG. 1b schematically illustrates the heat transfer, the catalytic process reaction time and/or the flushing time in relation to the object of FIG. 1a when the present invention is applied. Shown is the object (100) of FIG. 1a, but in a situation where the present invention is applied. The object (100) has the same temperature $T_1$ as in FIG. 1a and the surrounding or contacting gas (500) has also the same temperature $T_0$ as in FIG. 1a.

According to the first aspect, the object (100) (or a surface of the object) is according to the present invention submitted to high intensive sound or ultrasound in the contacting or surrounding gas(es). This leads to very high velocities and displacements of the gas molecules. In other words, the kinetic energy of the molecules is increased significantly by being subjected to ultrasound or high intensive sound. FIG. 1b illustrates that the high intensity sound or ultrasound will increase the interaction between gas molecules and the surface and thus the heat conduction that thereafter can be followed by passive or active convection at the surface, as will be explained in greater detail in connections with FIGS. 2a and 2b. The application of the invention results in a given heat transfer[2] that is greater than heat transfer[1] of FIG. 1a.

Since the limitations of heat transfer are equivalent to the same limitations of an effective catalytic process, the present invention also provides a way to decrease the reaction time of a catalytic process in air/gas on the surface of a catalyst surface by means of applying high intensity sound or ultrasound to the surface of an object. According to the second aspect of the present invention, a forced interaction between gas molecules and the surface of the catalyst is established, because the high intensity ultrasound will minimize the laminar sub-layer, as will be explained in greater detail in connections with FIGS. 2a and 2b. As a result the diffusion time will decrease and thus increasing the speed of the catalytic process. Applying the invention results in a given catalytic process reaction time[2] that is smaller/shorter than the catalytic process reaction time[1] of FIG. 1a.

Please note, that this process is not equivalent to ultrasound assisted catalytic processes in fluids, which already are well known and described in the prior art. The actual sound pressure in a gas will for instance be much less than those used in fluids for an ultrasound assisted catalytic process. Similarly there will be no possible cavitations processes in a gas.

Since the limitations of heat transfer are equivalent to the same limitations of an effective diffusion through the sub-layer, the present invention also provides a way to decrease the time to establish a new equilibrium when the gas composition in a volume is changed, by means of applying high intensity sound or ultrasound to the surface of an object. According to the third aspect of the present invention a forced interaction between gas molecules and a previous gas at the surface of the volume is established, because the high intensity ultrasound will minimize the laminar sub-layer, as will be explained in greater detail in connections with FIGS. 2a and 2b. As a result the diffusion time will decrease and thus increasing the speed of establishing the new equilibrium. Applying the invention results in a given flushing time[2] that is smaller/shorter than the flushing time[1] of FIG. 1a.

The gas may e.g. be air, steam, or any other kind of gas.

FIG. 2a schematically illustrates a (turbulent) flow over a surface of an object according to prior art. Shown is a surface (204) of an object with a gas (500) surrounding or contacting the surface (204). As mentioned, thermal energy can be transported through gas by conduction and also by the movement of the gas from one region to another. This process of heat transfer associated with gas movement is called convection. When the gas motion is caused only by buoyancy forces set up by temperature differences, the process is normally referred to as natural or free convection; but if the gas motion is caused by some other mechanism, such as a fan or the like, it is called forced convection. With a condition of forced convection there will be a laminar boundary layer (201) near to the surface (204). The thickness of this layer is a decreasing function of the Reynolds number of the flow, so that at high flow velocities, the thickness of the laminar boundary layer (201) will decrease. When the flow becomes turbulent the layer are divided into a turbulent boundary layer (202) and a laminar sub-layer (203). For nearly all practically occurring gas flows, the flow regime will be turbulent in the entirety of the streaming volume, except for the laminar sub-layer (203) covering the surface (204) wherein the flow regime is laminar. Considering a gas molecule or a particle (205) in the laminar sub-layer (203), the velocity (206) will be substantially parallel to the surface (204) and equal to the velocity of the laminar sub-layer (203). Heat transport across the laminar sub-layer will be by conduction or radiation, due to the nature of laminar flow. Mass transport across the laminar sub-layer will be solely by diffusion. The presence of the laminar sub-layer (203) does not provide optimal or efficient heat transfer or increased mass transport. Any mass transport across the sub-layer has to be by diffusion, and therefore often be the final limiting factor in an overall mass transport.

Figure 2B:
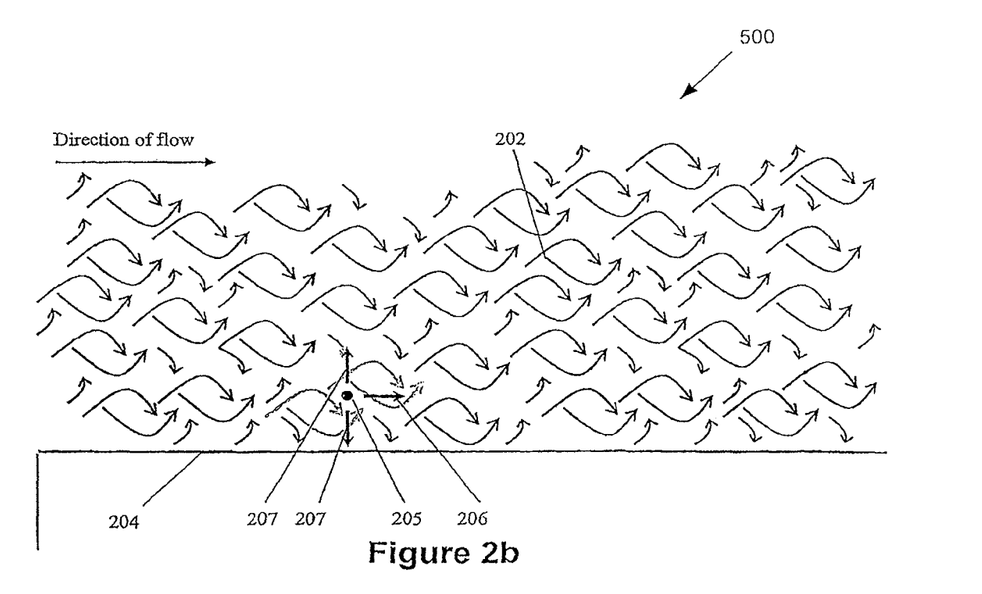
FIG. 2b schematically shows a flow over a surface of an object, where the effect of applying high intensity sound or ultrasound to/in air/gas surrounding or contacting a surface of an object according to the present invention is illustrated.

FIG. 2b schematically shows a flow over a surface of an object, where the effect of applying high intensity sound or ultrasound to/in air/gas (500) surrounding or contacting a surface of an object according to the present invention is illustrated. More specifically, FIG. 2b illustrates the conditions when the surface (204) is applied with high intensity sound or ultrasound. Again consider a gas molecule/particle (205) in the laminar layer; the velocity (206) will be substantially parallel to the surface (204) and equal to the velocity of the laminar layer prior applying ultrasound. In the direction of the emitted sound field to the surface (204) in FIG. 2b, the oscillating velocity of the molecule (205) has been increased significantly as indicated by arrows (207). As an example, a maximum velocity of v=4.5 m/sec and a displacement of +/−32 μm will be achieved where the ultrasound frequency f=22 kHz and the sound intensity=160 dB. The corresponding (vertical) displacement in FIG. 2b is substantially 0 since the molecule follows the laminar air stream along the surface. In result, the ultrasound will establish a forced heat flow from the surface to surrounding gas/air (500) by increasing the conduction by minimizing the laminar sub-layer. The sound intensity is in one embodiment 100 dB or larger. In another embodiment, the sound intensity is 140 dB or larger. Preferably, the sound intensity is selected from the range of approximately 140-160 dB. The sound intensity may be above 160 dB.

The minimized sub-laminar layer has the effect that heat transfer from the surface (204) to the surrounding or contacting gas (500) is increased (if the temperature of the surface is greater than the temperature of the surrounding or contacting gas). Further, the minimization will have the effect that the catalytic process reaction time is reduced if the surface/object is a catalyst and the surrounding gas comprises a reactant. Additionally, the minimization will have the effect that the flushing time is reduced In one embodiment, the invention is used to speed up the process of generating hydrogen from natural gas and steam. In this embodiment, the natural gas and the steam is directed at a surface of a catalyst enhancing the speed of the process as generally known. Further, the natural gas or the steam (or both) may be the medium through which the ultrasound is propagating as explained in the following. The efficiency is increased by the influence of the ultrasound as explained above and elsewhere.

Figure 3A:
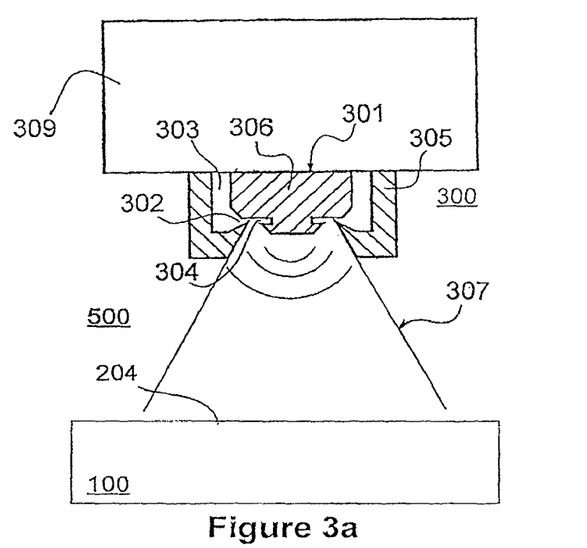
FIG. 3a schematically illustrates a preferred embodiment of a device for generating high intensity sound or ultrasound.

FIG. 3a schematically illustrates a preferred embodiment of a device (301) for generating high intensity sound or ultrasound. Pressurized gas is passed from a tube or chamber (309) through a passage (303) defined by the outer part (305) and the inner part (306) to an opening (302), from which the gas is discharged in a jet towards a cavity (304) provided in the inner part (306). If the gas pressure is sufficiently high then oscillations are generated in the gas fed to the cavity (304) at a frequency defined by the dimensions of the cavity (304) and the opening (302). An ultrasound device of the type shown in FIG. 3a is able to generate ultrasonic acoustic pressure of up to 160 $dB_{SPL}$ at a gas pressure of about 4 atmospheres. The ultrasound device may e.g. be made from brass, aluminum or stainless steel or in any other sufficiently hard material to withstand the acoustic pressure and temperature to which the device is subjected during use. The method of operation is also shown in FIG. 3a, in which the generated ultrasound (307) is directed towards a surface (204) of an object (100) i.e. a heat exchanger or a catalyst or the inside of a volume.

Please note, that the pressurized gas can be different than the gas that contact or surround the object.

Figure 3B:
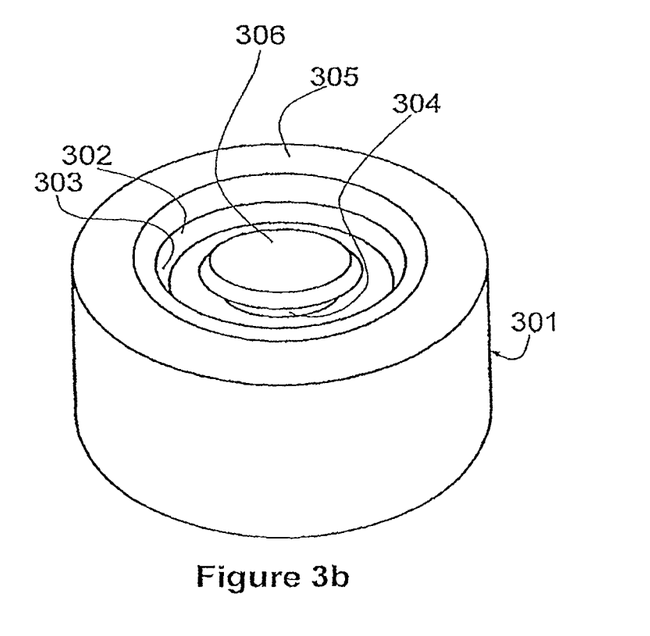
FIG. 3b shows an embodiment of an ultrasound device in form of a disc-shaped disc jet.

FIG. 3b shows an embodiment of an ultrasound device in form of a disc-shaped disc jet. Shown is a preferred embodiment of an ultrasound device (301), i.e. a so-called disc jet. The device (301) comprises an annular outer part (305) and a cylindrical inner part (306), in which an annular cavity (304) is recessed. Through an annular gas passage (303) gases may be diffused to the annular opening (302) from which it may be conveyed to the cavity (304). The outer part (305) may be adjustable in relation to the inner part (306), eg. by providing a thread or another adjusting device (not shown) in the bottom of the outer part (305), which further may comprise fastening means (not shown) for locking the outer part (305) in relation to the inner part (306), when the desired interval there between has been obtained. Such an ultrasound device may generate a frequency of about 22 kHz at a gas pressure of 4 atmospheres. The molecules of the gas are thus able to migrate up to 36 μm about 22,000 times per second at a maximum velocity of 4.5 m/s. These values are merely included to give an idea of the size and proportions of the ultrasound device and by no means limit of the shown embodiment.

Figure 3C:
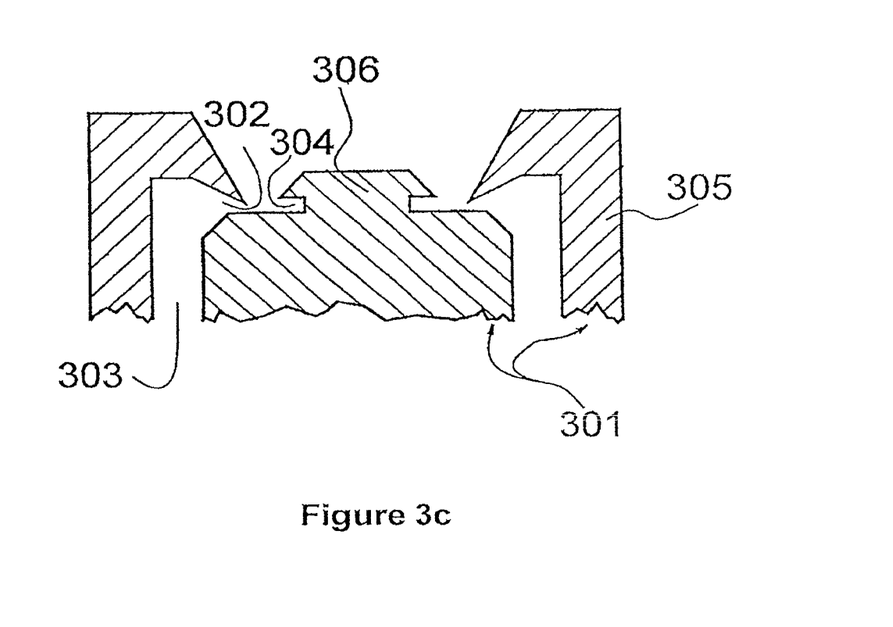
FIG. 3c is a sectional view along the diameter of the ultrasound device (301) in FIG. 3b illustrating the shape of the opening (302), the gas passage (303) and the cavity (304) more clearly.

FIG. 3c is a sectional view along the diameter of the ultrasound device (301) in FIG. 3b illustrating the shape of the opening (302), the gas passage (303) and the cavity (304) more clearly. It is further apparent that the opening (302) is annular. The gas passage (303) and the opening (302) are defined by the substantially annular outer part (305) and the cylindrical inner part (306) arranged therein. The gas jet discharged from the opening (302) hits the substantially circumferential cavity (304) formed in the inner part (306), and then exits the ultrasound device (301). As previously mentioned the outer part (305) defines the exterior of the gas passage (303) and is further beveled at an angle of about 30° along the outer surface of its inner circumference forming the opening of the ultrasound device, wherefrom the gas jet may expand when diffused. Jointly with a corresponding beveling of about 60° on the inner surface of the inner circumference, the above beveling forms an acute-angled circumferential edge defining the opening (302) externally. The inner part (306) has a beveling of about 45° in its outer circumference facing the opening and internally defining the opening (302). The outer part (305) may be adjusted in relation to the inner part (306), whereby the pressure of the gas jet hitting the cavity (304) may be adjusted. The top of the inner part (306), in which the cavity (304) is recessed, is also beveled at an angle of about 45° to allow the oscillating gas jet to expand at the opening of the ultrasound device.

Figure 3D:
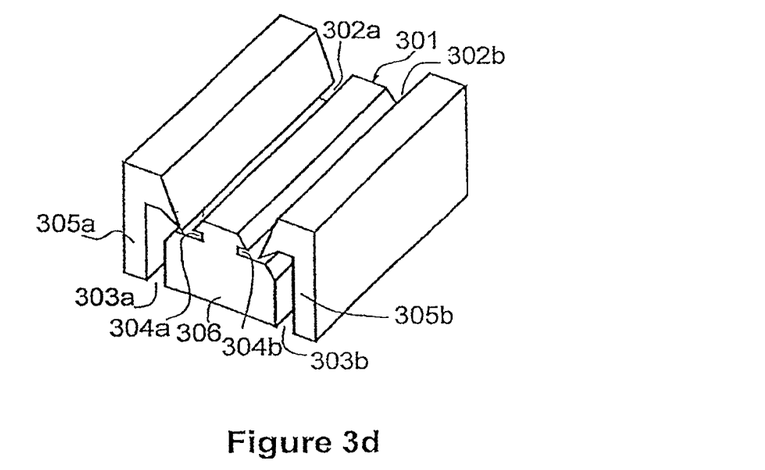
FIG. 3d illustrates an alternative embodiment of an ultrasound device, which is shaped as an elongated body.

FIG. 3d illustrates an alternative embodiment of an ultrasound device, which is shaped as an elongated body. Shown is an ultrasound device comprising an elongated substantially rail-shaped body (301), where the body is functionally equivalent with the embodiments shown in FIGS. 3a and 3b, respectively. In this embodiment the outer part comprises two separate rail-shaped portions (305a) and (305b), which jointly with the rail-shaped inner part (306) form an ultrasound device (301). Two gas passages (303a) and (303b) are provided between the two portions (305a) and (305b) of the outer part (305) and the inner part (306). Each of said gas passages has an opening (302a), (302b), respectively, conveying emitted gas from the gas passages (303a) and (303b) to two cavities (304a), (304b) provided in the inner part (306). One advantage of this embodiment is that a rail-shaped body is able to coat a far larger surface area than a circular body. Another advantage of this embodiment is that the ultrasound device may be made in an extruding process, whereby the cost of materials is reduced.

Figure 3E:
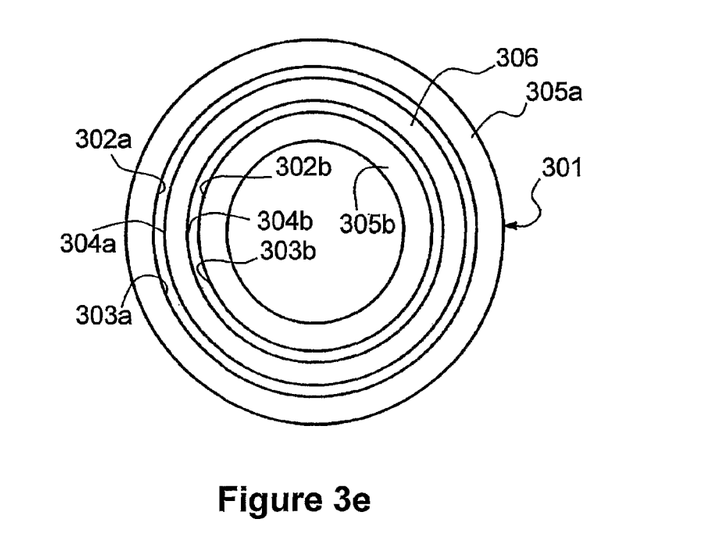
FIG. 3e shows an ultrasound device of the same type as in FIG. 3d but shaped as a closed curve.

FIG. 3e shows an ultrasound device of the same type as in FIG. 3d but shaped as a closed curve. The embodiment of the gas device shown in FIG. 3d does not have to be rectilinear. FIG. 3e shows a rail-shaped body (301) shaped as three circular, separate rings. The outer ring defines an outermost part (305a), the middle ring defines the inner part (306) and the inner ring defines an innermost outer part (305b). The three parts of the ultrasound device jointly form a cross section as shown in the embodiment in FIG. 3d, wherein two cavities (304a) and (304b) are provided in the inner part, an wherein the space between the outermost outer part (305a) and the inner part (306) defines an outer gas passage (303a) and an outer opening (302a), respectively, and the space between the inner part (306) and the innermost outer part (305b) defines an inner gas passage (304b) and an inner opening (302b), respectively. This embodiment of an ultrasound device is able to coat a very large area at a time and thus treat the surface of large objects.

Figure 3F:
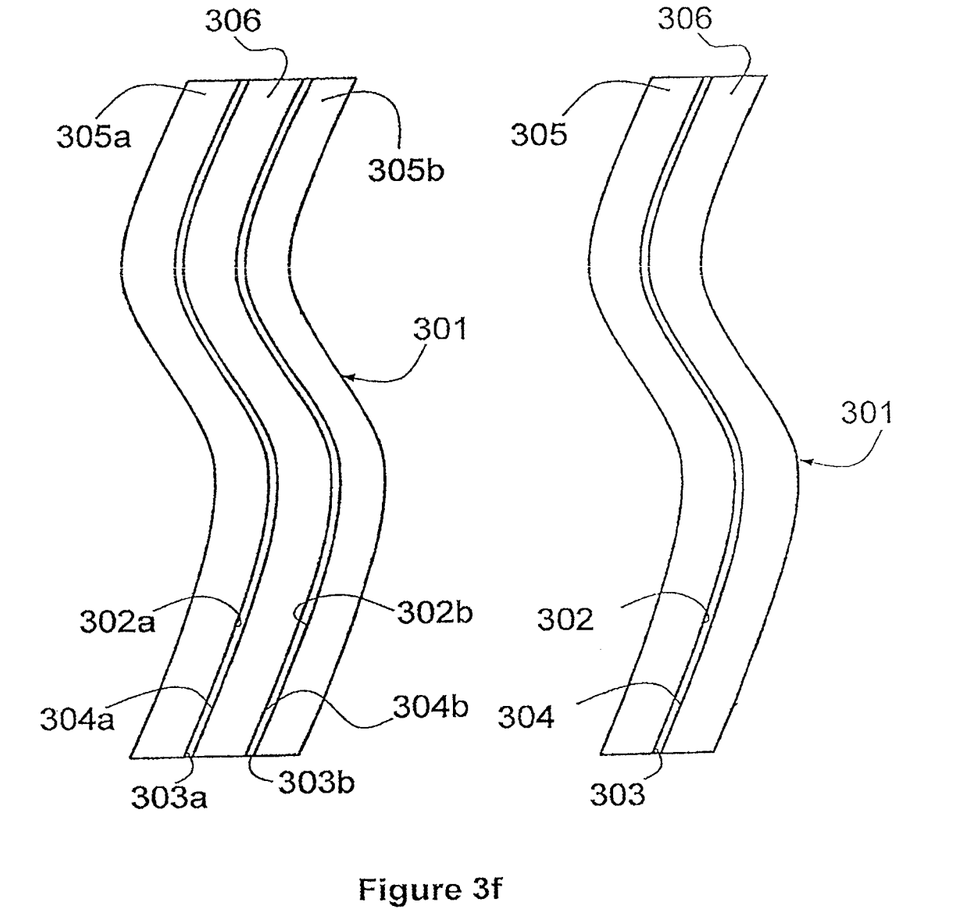
FIG. 3f shows an ultrasound device of the same type as in FIG. 3d but shaped as an open curve.

FIG. 3f shows an ultrasound device of the same type as in FIG. 3d but shaped as an open curve. As shown it is also possible to form an ultrasound device of this type as an open curve. In this embodiment the functional parts correspond to those shown in FIG. 3d and other details appear from this portion of the description for which reason reference is made thereto. Likewise it is also possible to form an ultrasound device with only one opening as described in FIG. 3b. An ultrasound device shaped as an open curve is applicable where the surfaces of the treated object have unusually shapes. A system is envisaged in which a plurality of ultrasound devices shaped as different open curves are arranged in an apparatus according to the invention.

Figure 4A:
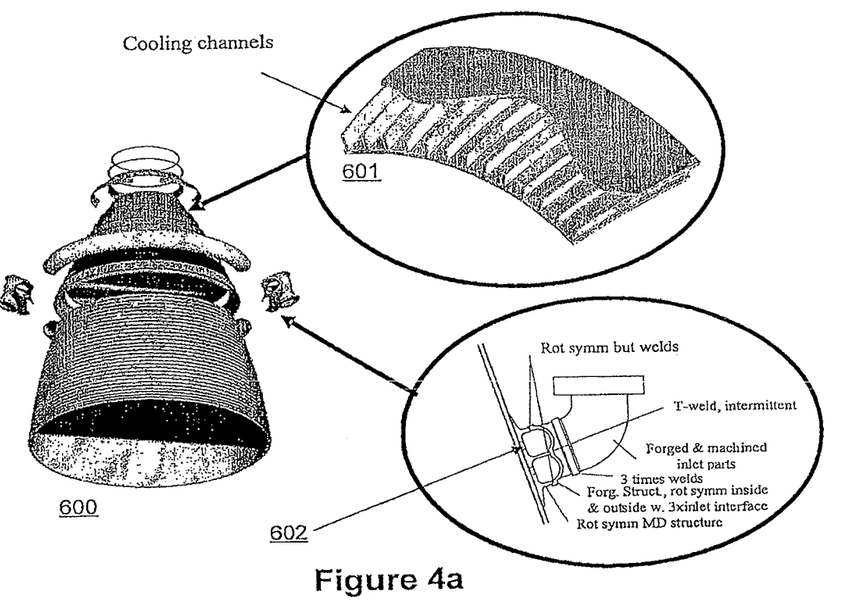
FIG. 4a illustrates an exploded view of a nozzle illustrating cooling channels and manifolds for cooling gas.

FIG. 4a illustrates an exploded view of a nozzle illustrating cooling channels and manifolds for cooling gas. Shown is a nozzle (600) comprising cooling channels (601) and manifolds (602).

Construction of nozzles, e.g. for use in rockets, is in many ways limited by the aspect of establishing an efficient cooling of the inner wall of the nozzle (600).

Having the walls to thin gives a too weak construction, which cannot fulfill the necessary requirements during use. On the other hand, a too thick wall will not be able to be cooled efficiently and the surface temperature of the inner wall will be too high.

The cooling of the inner wall is often established by having a hollow wall structure with a number of cooling channels (601), where an appropriate cooling gas is forced through.

The efficiency of the cooling is among other things, limited by the following:
- The efficiency of heat transport from the warm inner wall of the channel (601) to the cooling gas. That part of the heat, which is transferred by convection, will be limited by the thickness of the laminar sub-layer above the surface of the walls, as described previously. In the sub-layer, the heat transport time will be limited to diffusion time and
- The cooling is also limited due to a change of density of the cooling gas when the gas temperature increases. The cold gas, having a high density, is forced against the outer wall of the nozzle because of gas velocity and nozzle geometry. This effect is amplified as the gas near the inner surface gets warmer thereby having less density. The overall heat distribution in the gas is therefore limited by the insufficient mixing of warm and cold gas.

Figure 4B:
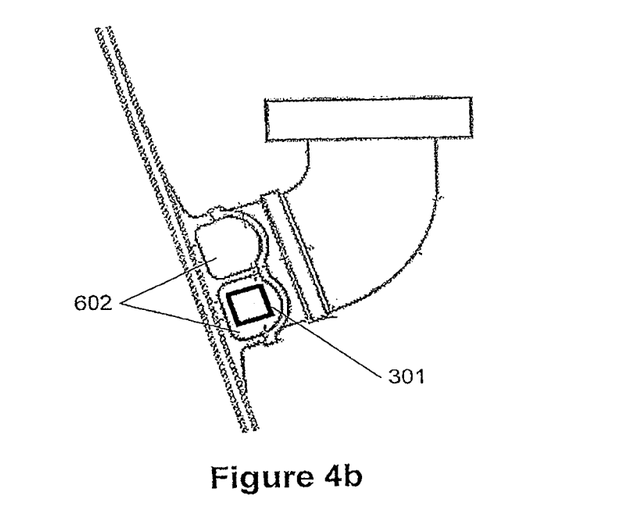
FIG. 4b illustrates one example of a placement of an ultrasound generator in a manifold according to one embodiment of the present invention.

FIG. 4b illustrates one example of a placement of an ultrasound generator in a manifold according to one embodiment of the present invention.

Shown is a manifold (602), e.g. corresponding to the one of FIG. 4a, comprising an aerodynamic ultrasonic generator (301), e.g. a disk-jet or the like. Preferably, the ultrasonic generator (301) is located at the inlet of the cooling gas or likewise. The ultrasound generator (301) may e.g. be powered by an approx. 4 bar pressure drop of the gas. The generated ultrasound will be distributed in the channels (601) e.g. via the manifolds (602).

Primarily, the high-energy ultrasound will disrupt the laminar sub-layer, as described earlier, giving an up to two times higher energy transport from the walls to the gas.

Additionally, the high-energy ultrasound will mix the warm and cold parts of the cooling gas, due to the very high particle movements in the gas increasing cooling even further.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention claimed is:

1. A method of enhancing a process involving a solid object and a gas, the method comprising:
    placing the solid object before a sonic device;
    introducing the gas so that the gas flows over a surface of the object; and
    applying by the sonic device a high intensity sound or ultrasound to at least the surface of the object to disrupt a laminar sub-layer at the surface of the object and thereby enhance the process involving the solid object and the gas, whereby the high intensity sound or ultrasound is applied in the gas that is the medium through which the high intensity sound or ultrasound propagates to the surface of the object, and the high intensity sound or ultrasound has an intensity that is 140 dB or larger.

2. The method of claim 1, wherein the sound intensity of the high intensity sound or ultrasound is selected from the range of 140-160 dB.

3. The method of claim 1, wherein the sonic device comprises:
    an outer part and an inner part defining a passage, an opening, and a cavity provided in the inner part, the method further comprising:
    receiving a pressurized gas in the sonic device, passing the pressurized gas to the opening, discharging the pressurized gas in a jet towards the cavity from the opening.

4. The method of claim 1, wherein a temperature of the surface is greater than a temperature of the gas, and the process is a heat exchange process, whereby the disruption of the laminar sub-layer causes an increased heat exchange from the object to the gas.

5. The method of claim 1, wherein a temperature of the surface is smaller than a temperature of the gas, and the process is a heat exchange process, whereby the disruption of the laminar sub-layer causes an increased heat exchange from the gas to the object.

6. The method of claim 1, wherein the surface of the object is a catalyst and that the gas comprise at least one reactant of the catalyst, and the process is a catalytic process, whereby the disruption of the laminar sub-layer causes an increased speed of the catalytic process.

7. The method of claim 1, wherein the surface is an inner surface of a given volume, and the process is a change of gas composition between the gas and a previous gas composition at the inner surface, whereby the disruption of the laminar sub-layer causes an increased gas exchange by increasing the interaction between gas molecules of the gas and the previous gas composition at the inner surface.

8. The method of claim 1, wherein the sound intensity of the high intensity sound or ultrasound is above 160 dB.

9. The method of claim 1, wherein the high intensity sound or ultrasound is generated by the sonic device directly in the gas that is the medium through which the high intensity sound or ultrasound propagates to the surface of the object.

10. The method of claim 1, wherein the high intensity sound or ultrasound is generated by the sonic device directly in a gas that is different from the gas that is the medium through which the high intensity sound or ultrasound propagates to the surface of the object.

* * * * *